Patented Nov. 15, 1938

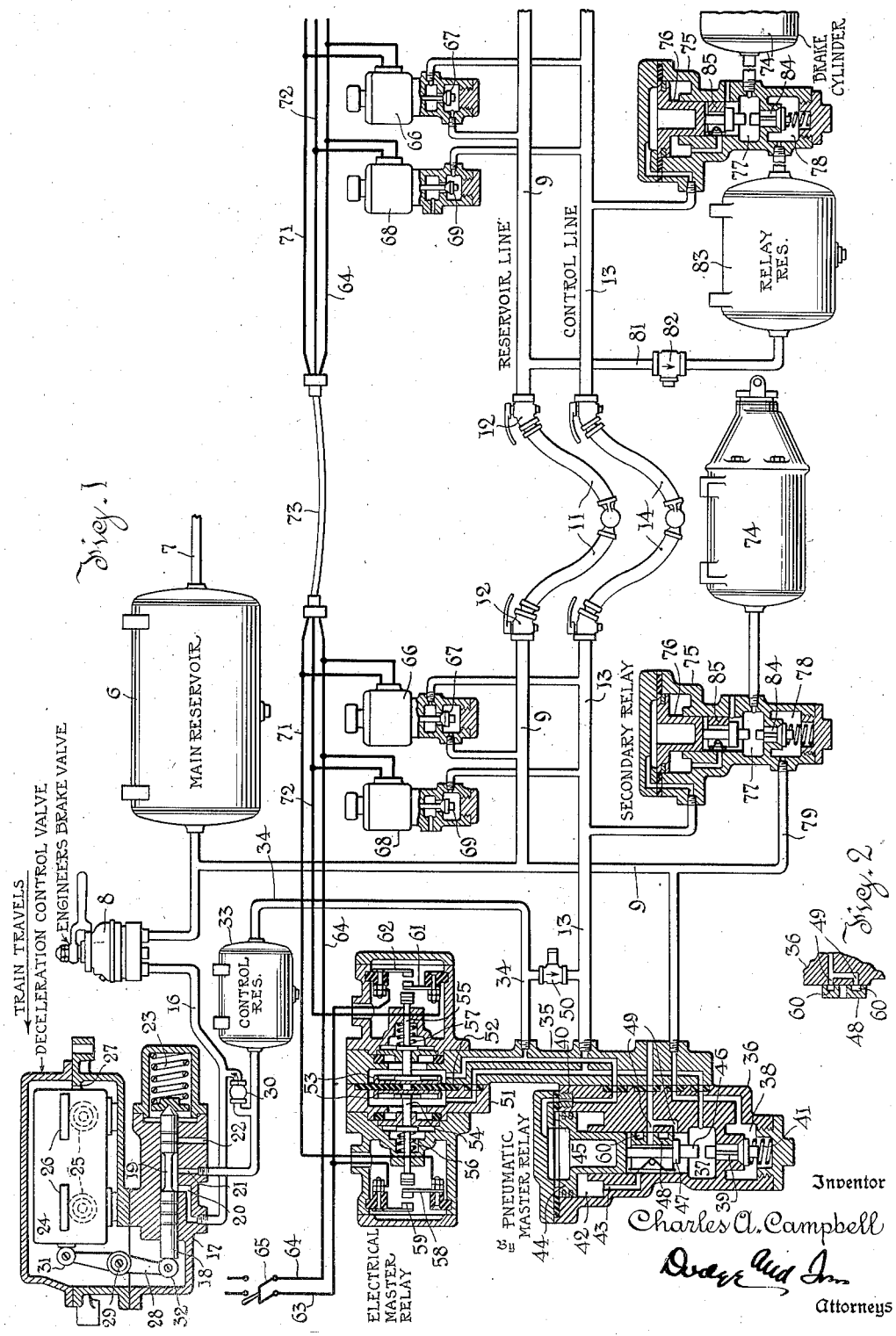

2,136,577

UNITED STATES PATENT OFFICE 2,136,577

FLUID PRESSURE BRAKE

Charles A. Campbell, Watertown, N. Y., assignor to The New York Air Brake Company, a corporation of New Jersey Application May 10, 1934, Serial No. 724,989

60 Claims. (Cl. 303—15)

This invention relates to fluid pressure brakes and broadly considered relates to what are commonly called electro-pneumatic brakes. According to the invention, a pneumatic brake is subjected to primary electrical control and secondary pneumatic control, with the result that the speed of electric control is combined with the desirable features (including certainty of operation) characteristic of pneumatic control. Both the electrical and the pneumatic controls are modulated by means responsive to the rates of deceleration produced by brake applications. The term "pneumatic" is appropriately descriptive because most fluid pressure brakes are operated by air, but is here used in a generic sense, for the invention is generally applicable to what the Patent Office terms fluid pressure brakes.

The present trend of the art of braking high speed trains is toward the use of deceleration controllers which graduate the brake application in response to the rate of deceleration produced by the application, the effect being to maintain the maximum deceleration permissible without danger of locking the wheels. To secure uniform action throughout a train it is desirable to use a single deceleration controller for the whole train.

The most practical pneumatic arrangement so far evolved to that end, makes use of a control reservoir in which during brake applications, a deceleration controller establishes a pressure which varies in response to the deceleration rate. The pressure so established in the reservoir operates a primary pneumatic relay to establish in the control line of the train a related pressure. The pressure in the control line operates (usually through automatic valve devices, preferably secondary pneumatic relays) to establish related pressures in the brake cylinders. The effect is to compensate for variations in the braking effect incident to changes in the coefficient of brake shoe friction as the train slows, as well as other variables which are always present.

Any such system is subject in its operation to time lag factors incident to resistance to flow in the control pipe. To eliminate this lag without dispensing with the regulatory action of the primary pneumatic relay, the present invention provides a second and more sensitive primary relay taking the form of a pneumatically actuated electric switch, which responds to control reservoir pressure, and controls electrical train circuits to selectively energize supply and exhaust valves, located at appropriate intervals on the control line. The electrically actuated supply and exhaust valves function to admit and exhaust pressure fluid (air) to and from the control line, thus changing the pressure locally at several points throughout its length. This is important, since it ensures change of control line pressure and permits some leveling off of control line pressure before the secondary valves can respond.

With such a system the electrical relay initiates changes of control line pressure throughout the length of the control line, in response to changes of control reservoir pressure insufficient to affect the primary pneumatic relay. Hence, the primary pneumatic relay serves normally to perform no graduating functions. Should the electrical relay fail to function, the pneumatic relay assumes the duty. Consequently, the operation of the system is not solely dependent on the maintenance of the electrical circuits.

The scheme of using two relays, one sensitive and controlling electric circuits, and the other pneumatic and slightly less sensitive, both responsive to pressure changes in a single control reservoir, or the like, can be applied to the control of a wide variety of brake systems, both straight air and automatic.

For purposes of explanation, the invention will here be described as applied to a two pipe straight air system using relay valves, with which its action is typical. In order to simplify the disclosure, a very simple two pipe system is described, but the applicability of the invention to more refined and complicated systems known in the art, will be readily discerned, and is fully recognized.

In the drawing,

Fig. 1 is a view partly in elevation and partly in section of the brake equipment of a motor car (or locomotive) and one trailing vehicle.

Fig. 2 is a fragmentary view showing exhaust valve of the master pneumatic relay in closed position.

The main reservoir 6 is charged, by any suitable means, through the connection 7 and supplies air to the engineer's brake valve 8 and the reservoir line 9 which extends throughout the train of vehicles, and is connected from vehicle to vehicle by separable flexible hose 11 with angle cocks 12, as usual. Any suitable number of vehicles may be connected in a train and the angle cock 12 at the rear end of the train (not shown) is closed, as usual.

The engineer's brake valve is illustrated as of the ordinary straight air type and functions to connect pipe 16 selectively with main reservoir 6 (application position) or with atmosphere (release position) or to disconnect it from both (lap position).

Pipe 16 leads to the supply port 20 in the body 17 of the deceleration control valve. Body 17 has a cylindrical seat or bore for a balanced piston valve 18. This valve has end portions which seal in the bore and slide freely therein and which are connected by a reduced middle portion 19. In the seat are a control chamber port 21 and an exhaust port 22, the ports being so located and the valve so dimensioned that the reduced portion 19 may connect port 21 selectively with ports 20 and 22, and in mid-position of the valve isolates it from both.

Stated differently, valve 18 is of the inside cut-off, balanced piston type, and in mid-position has a slight lap as to ports 20 and 22.

The valve 18 is urged forward, with reference to the direction of travel of the train (left in the drawing) by a coil compression spring 23, and is forced in the reverse direction by the inertia effect of a mass 24 when the train is rapidly decelerated by a brake application. Mass 24 is guided to move freely in the direction of travel of the train by rollers 25 and track members 26. Its normal position is defined by stop 27 and its motion relatively to the train is transmitted to valve 18 by lever 28 fulcrumed at 29 and having at its opposite ends two rollers, one of which, 31, engages the forward end of inertia mass 24 and the other of which, 32, engages the forward end of valve 18.

Port 21 is connected to control reservoir 33 and this in turn is connected by pipe 34 to a passage in bracket member 35. A bypass check valve 30 between reservoir 33 and pipe 16 permits release by the brake valve 8 when valve 18 blanks port 20. The control line 13 and a branch of the reservoir line 9 are each connected with corresponding passages in bracket 35. A bypass check valve 50, spring loaded to open when pressure in reservoir pipe 34 exceeds pressure in control pipe 13 by say 8 pounds per square inch, connects these pipes, and ensures an application if the pneumatic master relay valve should be sluggish, and permits one to be made if the supply line to the master pneumatic relay is ruptured.

Mounted on bracket 35 is the body 36 of the pneumatic master relay. This body has removable end closures, as shown. In this body are a chamber 37, in communication with control line 13, and a chamber 38 in communication with the reservoir line 9. A poppet valve 39 closing toward chamber 37 controls flow from chamber 38 to chamber 37. A coil compression spring 41 assists in seating the valve and is stressed sufficiently to offer substantial resistance to opening of the valve (i. e. it loads the valve). In the body 36 is a cylinder 42 whose lower end is connected by restricted port 43 with chamber 37 and whose upper end is in communication with control reservoir pipe 34 through a flow resisting choke 40. A piston 44 works in cylinder 42 and hence is subject to control reservoir pressure on its upper face and the pressure in valve chamber 37 on its lower face. The choke 40 exercises an appreciable delaying or stabilizing effect so that piston 44 is somewhat delayed in its response to changes of pressure in control reservoir 33, and control line 13.

The piston 44 has an extension or hub 45 which makes a free fit on the upper end of chamber 37 and serves to protect the piston from the blast of air entering chamber 37 when valve 39 is opened. Beyond hub 45 is a stem 46 which, when the piston moves downward, engages valve 39, and on further downward motion unseats it.

Stem 46 has a collar 47, between which, and hub 45, a slide valve 48 of the grid type is confined. When piston 44 is in its upper position valve 48 exposes two atmospheric exhaust ports 49. When stem 46 engages valve 39 without opening it the exhaust ports 49 are closed but communicate with loading cavities 60 larger than ports 49 in valve 48, thus increasing the pressure differential forcing the valve to its seat, and consequently increasing the frictional resistance to motion of the slide valve (see Fig. 2).

Clamped between bracket 35 and member 51 is a flexible diaphragm 52. The bracket 35 is formed with a chamber to the right of the diaphragm in communication with control chamber pipe 34, and the member 51 is formed with a chamber to the left of the diaphragm in communication with the control pipe 13. Thus the diaphragm 52, like the piston 42, is subject in opposite directions to control chamber pressure and control pipe pressure, and is very sensitive to pressure differentials.

The diaphragm 52 is clamped at its middle between disks 53 which act in thrust with two alined switch-actuating plungers 54 and 55, each urged toward the diaphragm by respective compression springs 56, 57. The plungers are suitably guided to prevent or minimize the leakage of pressure fluid, but such features are conventional and need not be elaborated.

Plunger 54 when forced outward by the diaphragm presses yielding contactor 58 against contact 59. Plunger 55 when forced outward by the diaphragm presses yielding contactor 61 against contact 62.

Electric current is supplied by a circuit including a supply line 63 and a common return line 64, controlled by switch 65. Supply line 63 is connected to contacts 59 and 62. Return line 64 runs through the length of the train and is connected to one terminal of the winding 66 of each of the normally closed electrically actuated inlet valves 67 which control supply connections from reservoir line 9 to control line 13. Return line 64 is also connected to one terminal of the winding 68 of each of the normally closed electrically actuated exhaust valves 69 which control vents from the control line to atmosphere.

An application line 71 connects contactor 58 with the second terminal of each of the windings 66 and a release line 72 connects the contactor 61 with the second terminal of each of the windings 68. A jumper cable, diagrammatically indicated at 73, is used to connect the lines 64, 71 and 72 from car to car. The electrically actuated valves 66—67 and 68—69 are shown as simple magnet valves, but any of the electrically controlled valves, commonly used in the electro-pneumatic brake art, may be substituted.

Pressure in the brake cylinders 74 is controlled by local relays 75 which are shown as generally similar to the pneumatic master relay already described in detail, and hence require only general description. Control line 13 is connected to the spaces above pistons 76, and the brake cylinders are connected freely to respective valve chambers 77. The supply chambers 78 are fed from the reservoir 6. On the leading vehicle the supply connection is shown as a simple branch 79 of pipe 9 but on the trailer a branch 81 leads from pipe 9 through a check valve 82 to a local reservoir 83, called a relay reservoir, which is directly connected to chamber 78. Either arrangement can be used on either vehicle, but that shown on the trailing vehicle has obvious advantages.

In the local relays 75 the inlet valves 84 are identical with valve 39 but are only lightly spring loaded. The exhaust valves 85 differ from valve 48 in that they are not of the grid type and have no loading cavities. The grid type is used in the master relay to secure large capacity with short valve travel, that being a familiar characteristic of grid valves, and the loading of the inlet and exhaust valves is used to delay slightly the response of the pneumatic master relay. Such delay is not desired in the case of the local relays.

The parts are shown in the drawing in the position which they assume when the train is running and the brakes are off. To make an application, the engineer manipulates the brake valve. Since ports 20 and 21 are connected by the reduced portion 19 of the valve 18, the effect is to develop in the reservoir 33 a pressure which determines the initial intensity of the brake application. Pressure in the reservoir 33 functions to produce an application by forcing the diaphragm 52 to the left and forcing the piston 44 downward with reference to the location of parts on the drawing.

Motion of the diaphragm 52 to the left closes the circuit between contacts 58 and 59 so that windings 66 throughout the train are excited and air under pressure flows from the normally charged reservoir line 9 to the normally vented control line 13. Thus air under pressure is supplied to the control line throughout its length. The descent of piston 44 closes the normally open exhaust ports 49 and then ceases as stem 46 engages valve 39 without opening it. In this position slide valve 48 is loaded as explained.

The resulting rise of pressure in the control line causes the piston 76 of the relay valve 75 to move downward so that the valves 85 close the exhaust ports from the brake cylinders 74 and admit air from the chamber 78 past valves 84 to the brake cylinders 74.

The local relay valves 75 will lap when brake cylinder pressure rises to equality with control line pressure. The pneumatic master relay valve remains in lap position, and when control line pressure reaches approximate equality with control reservoir pressure the diaphragm 52 returns to its middle position so that both circuits are open. If the application of the brakes is sufficiently severe to cause the decelerometer mass to overpower spring 23, valve 18 will shift, blanking port 20. Since the retarding effect increases as the train slows, the valve 18 will exercise a graduating effect by connecting and disconnecting the ports 21 and 22. This gradually reduces the pressure in the control reservoir 73 and as this pressure falls below control line pressure, diaphragm 52 will tend to move to the right but the piston 44 will remain at rest in lap position. The diaphragm 52 will close the circuit through contacts 61 and 62 and by energizing the windings 68 throughout the train will reduce control line pressure.

When the train comes to rest the deceleration controller will resume the normal position shown in Fig. 1 and the engineer's brake valve may then be manipulated to release the brakes.

It will be observed that the electric master relay controls the braking functions and the pneumatic master relay merely shifts to lap position and stays there during an application. The electrical relay performs its functions by admitting or exhausting air from the control line at a plurality of points throughout its length.

The pneumatic master relay shifts to release position at the end of release when the reduction of control line pressure reduces the loading on valve 48 and thus reduces its resistance to motion.

Should the electrical master relay fail to function, for any reason, the pressure differentials on piston 44 would increase sufficiently to overcome the loading of the valves 39 and 48 so that in such case the pneumatic master relay assumes the control of pressure in control line 13.

The spring loading of inlet valve 39 and the pneumatic loading of exhaust slide valve 48 when the latter is closed are relied on to arrest and retain the pneumatic master relay in lap position during normal applications. This effect is perhaps assisted somewhat by choke 40 but the chief purpose of choke 40, and also of restricted port 43, is to protect piston 44 from pressure surges initiated by the action of the electrical master relay. If such surges should affect the master pneumatic relay sufficiently to cause it to open either of its valves there would be an immediate pneumatic reaction upon the electrical relay. Thus a vicious circle would be created, in which the two master relays would react unfavorably upon each other with particularly harmful results upon the stability of sensitive electrical master relay. The choke 40 obviates this difficulty.

As has already been stated, the present invention is concerned with the use of the electrical master relay in conjunction with the pneumatic master relay, and to avoid unduly complicating the drawing, the electrically actuated valves and the secondary relays which control brake cylinder pressure have been shown in the simplest possible form. In commercial installations it is undoubtedly desirable to make use of various refinements known in the art, and such use is contemplated, but since these features do not affect the operation of the two master relays with which the present invention is primarily concerned, it is not necessary to illustrate such refinements in this application.

What is claimed is,—

1. In a fluid pressure brake system, the combination of a source of pressure fluid; means for establishing a regulatory pressure; a control line; two relay motors each responsive to differentials between said regulatory pressure and pressure in said control line; valve means mechanically actuated by one of said motors and serving to regulate control line pressure; electrically actuated valve means operable to regulate control line pressure; and switching means operable by the other relay motor and controlling said electrically actuated valve means.

2. In a fluid pressure brake system, the combination of a source of pressure fluid; means for establishing a regulatory pressure; means responsive to the rate of deceleration produced by a brake application, and serving to modulate said regulatory pressure; a control line; two relay motors each responsive to differentials between said regulatory pressure and pressure in said control line; valve means mechanically actuated by one of said motors and serving to regulate control line pressure; electrically actuated valve means operable to regulate control line pressure; and switching means operable by the other relay motor and controlling said electrically actuated valve means.

3. In a fluid pressure brake system, the combination of a source of pressure fluid; means for establishing a regulatory pressure; a control line for controlling braking pressure; two motor means individually responsive to differentials between said regulatory pressure and pressure in said control line; valve means operated by one of said motor means and controlling admission of pressure fluid from said source to said control line and exhaust of fluid from said control line; an admission circuit including at least one electrically operable valve controlling admission of pressure fluid to said control line; an exhaust circuit including at least one electrically operable exhaust valve controlling exhaust from said control line; and switching means operable by the other of said motor means and arranged to energize said circuits selectively.

4. In a fluid pressure brake system, the combination of a source of pressure fluid; means for establishing a regulatory pressure; means responsive to the rate of deceleration produced by a brake application, and serving to modulate said regulatory pressure; a control line for controlling braking pressure; two motor means individually responsive to differentials between said regulatory pressure and pressure in said control line; valve means operated by one of said motor means and controlling admission of pressure fluid from said source to said control line and exhaust of fluid from said control line; an admission circuit including at least one electrically operable valve controlling admission of pressure fluid to said control line; an exhaust circuit including at least one electrically operable exhaust valve controlling exhaust from said control line; and switching means operable by the other of said motor means and arranged to energize said circuits selectively.

5. In a fluid pressure brake system, the combination of a source of pressure fluid; means for establishing a regulatory pressure; admission and exhaust valve means serving to modulate said regulatory pressure; inertia means responsive to deceleration produced by a brake application, and connected to actuate said admission and exhaust valve means; a control line for controlling braking pressure; two motor means individually responsive to differentials between said regulatory pressure and pressure in said control line; valve means operated by one of said motor means and controlling admission of pressure fluid from said source to said control line and exhaust of fluid from said control line; an admission circuit including at least one electrically operable valve controlling admission of pressure fluid to said control line; an exhaust circuit including at least one electrically operable exhaust valve controlling exhaust from said control line; and switching means operable by the other of said motor means and arranged to energize said circuits selectively.

6. The combination defined in claim 3 in which the second motor means is a relatively sensitive flexible diaphragm, and a plurality of electrically actuated admission valves and exhaust valves of limited flow capacity are used, said valves being located at intervals in the length of said control line.

7. The combination defined in claim 4, in which the second motor means is a relatively sensitive flexible diaphragm, and a plurality of electrically actuated admission valves and exhaust valves of limited flow capacity are used, said valves being located at intervals in the length of said control line.

8. The combination defined in claim 5, in which the second motor means is a relatively sensitive flexible diaphragm, and a plurality of electrically actuated admission valves and exhaust valves of limited flow capacity are used, said valves being located at intervals in the length of said control line.

9. In a fluid pressure brake system, the combination of a source of pressure fluid; means for establishing a regulatory pressure; a control line; a movable abutment subject to the differential between said regulatory pressure and pressure in said control line; valve means controlling admission and exhaust of pressure fluid to and from said control line, said means being operable by said abutment and having a lap position in which admission and exhaust are both closed; means effective in said lap position to increase the resistance to motion from such position; a second movable abutment subject to the differential between said regulatory pressure and pressure in said control line; electrically controlled valve means for admitting and exhausting pressure fluid to and from said control line; and electric switching means operable by said second abutment and connected to control said electrically controlled valve means.

10. In a fluid pressure brake system, the combination of a source of pressure fluid; means for establishing a regulatory pressure; means responsive to the rate of deceleration produced by a brake application and serving to modulate said regulatory pressure; a control line; a movable abutment subject to the differential between said regulatory pressure and pressure in said control line; valve means controlling admission and exhaust of pressure fluid to and from said control line, said means being operable by said abutment and having a lap position in which admission and exhaust are both closed; means effective in said lap position to increase the resistance to motion from such position; a second movable abutment subject to the differential between said regulatory pressure and pressure in said control line; electrically controlled valve means for admitting and exhausting pressure fluid to and from said control line; and electric switching means operable by said second abutment and connected to control said electrically controlled valve means.

11. The combination defined in claim 9 in which the first named movable abutment is a piston, and the second movable abutment is a sensitive flexible diaphragm.

12. The combination defined in claim 10 in which the first named movable abutment is a piston, and the second movable abutment is a sensitive flexible diaphragm.

13. In a fluid pressure brake system, the combination of a source of pressure fluid; means for establishing a regulatory pressure; a control line; a movable abutment subject to the differential between said regulatory pressure and pressure in said control line; valve means controlling admission and exhaust of pressure fluid to and from said control line, said means being operable by said abutment and having a lap position in which admission and exhaust are both closed; means effective in said lap position to increase the resistance to motion from such position; a second movable abutment subject to the differential between said regulatory pressure and pressure in said control line; electrically controlled valve means for admitting and exhausting pressure fluid to and from said control line; electric switching means operable by said second abutment and connected to control said electrically controlled valve means; and flow restricting means for delaying the action of said differentials on the first abutment.

14. In a fluid pressure brake system, the combination of a source of pressure fluid; means for establishing a regulatory pressure; means responsive to the rate of deceleration produced by a brake application and serving to modulate said regulatory pressure; a control line; a movable abutment subject to the differential between said regulatory pressure and pressure in said control line; valve means controlling admission and exhaust of pressure fluid to and from said control line, said means being operable by said abutment and having a lap position in which admission and exhaust are both closed; means effective in said lap position to increase resistance to motion from such position; a second movable abutment subject to the differential between said regulatory pressure and pressure in said control line; electrically controlled valve means for admitting and exhausting pressure fluid to and from said control line; electric switching means operable by said second abutment and connected to control said electrically controlled valve means; and flow restricting means for delaying the action of said differentials on the first named abutment.

15. In a brake system, the combination of a source of pressure fluid; a control line; and two relay valve mechanisms operable by differentials between a regulatory pressure and pressure in the control line to admit and exhaust pressure fluid to and from the control line, both of said mechanisms having a neutral position and one having a less resistance to motion from said neutral position than the other, and serving to admit and exhaust pressure fluid to and from the control line at a plurality of different points in the length thereof.

16. In a brake system, the combination of a source of pressure fluid; a control line; two relay valve mechanisms operable by differentials between a regulatory pressure and pressure in the control line to admit and exhaust pressure fluid to and from the control line, both of said mechanisms having a neutral position and one having a greater resistance to motion from said neutral position than the other; and flow restricting means for delaying the action of said pressure differentials on the relay valve mechanism having such greater resistance.

17. The combination defined in claim 15 in which the relay having the less resistance to motion comprises electrically controlled valves and controlling switches therefor actuated by a sensitive flexible diaphragm.

18. The combination defined in claim 16 in which the relay having the less resistance to motion comprises electrically controlled valves and controlling switches therefor actuated by a sensitive flexible diaphragm.

19. In a pressure brake system, the combination of a source of pressure fluid; a control line; means for establishing a regulatory pressure; valve means for regulating control line pressure; electrically actuated valve means for regulating control line pressure; switching means for controlling the electrically actuated valve means; and means responsive to differentials between said regulatory pressure and pressure in the control line, for actuating the first-named valve means and said switching means.

20. The combination defined in claim 19 in which the means responsive to differentials is so contrived that the switching means are actuated in advance of actuation of the first-named valve means.

21. In a fluid pressure brake system, the combination of a source of pressure fluid; a control line; means for establishing a regulatory pressure; means responsive to the rate of deceleration produced by a brake application and serving to modulate said regulatory pressure; valve means for regulating control line pressure; electrically actuated valve means for regulating control line pressure; switching means for controlling the electrically actuated valve means; and means responsive to differentials between said regulatory pressure and pressure in the control line, for actuating the first-named valve means and said switching means.

22. In a fluid pressure brake system, the combination of a source of fluid pressure; a control line for controlling braking pressure; means for establishing a regulatory pressure; valve means serving to control admission of pressure fluid from said source to and exhaust from said control line; an admission circuit including at least one electrically operable admission valve controlling admission of pressure fluid to the control line; an exhaust circuit including at least one electrically operable exhaust valve controlling exhaust from said control line; switching means for energizing said circuits selectively; and means responsive to differentials between said regulatory pressure and pressure in the control line, for actuating the first-named valve means and said switching means.

23. The combination defined in claim 22, in which the means responsive to differentials is so contrived that the switching means are actuated in advance of actuation of the first-named valve means.

24. In a fluid pressure brake system, the combination of a source of fluid pressure; a control line for controlling braking pressure; means for establishing a regulatory pressure; means responsive to the rate of deceleration produced by a brake application and serving to modulate said regulatory pressure; valve means serving to control admission of pressure fluid from said source to, and exhaust from said control line; an admission circuit including at least one electrically operable admission valve controlling admission of pressure fluid to the control line; an exhaust circuit including at least one electrically operable exhaust valve controlling exhaust from said control line; switching means for energizing said circuits selectively; and means responsive to differentials between said regulatory pressure and pressure in the control line, for actuating the first-named valve means and said switching means.

25. In a fluid pressure brake system, the combination of a source of pressure fluid; a control line; means for establishing a regulatory pressure; admission and exhaust valve means serving to modulate said regulatory pressure; inertia means responsive to deceleration produced by a brake application, and connected to actuate said admission and exhaust valve means; valve means controlling admission of pressure fluid from said source to said control line, and exhaust of fluid from said control line; an admission circuit including at least one electrically operable admission valve controlling admission of pressure fluid to said control line; an exhaust circuit including at least one electrically operable exhaust valve controlling exhaust from said control line; switching means arranged to energize said circuits selectively; and means responsive to differentials between said regulatory pressure and pressure in the control line, for actuating the second-named valve means and said switching means.

26. The combination defined in claim 25 in which the means responsive to differentials is so contrived that the switching means is actuated in advance of the actuation of the second-named valve means.

27. In a fluid pressure brake, the combination of a source of pressure fluid; a reservoir line fed thereby; a control line; brake cylinders; local relay valves subject to control line pressure, and serving to admit pressure fluid from the reservoir line to respective brake cylinders and to exhaust it therefrom; a control reservoir; a brake valve for admitting and exhausting pressure fluid to and from the control reservoir; valve means serving to control the admission of pressure fluid to and exhaust from said control line; an admission circuit including at least one electrically operable admission valve controlling admission of pressure fluid to the control line; an exhaust circuit including at least one electrically operable exhaust valve controlling exhaust from said control line; switching means controlling said circuits; and means responsive to differentials between the pressures in said control reservoir and in said control line for actuating said valve means and said switching means.

28. The combination defined in claim 27 in which the means responsive to differentials is so contrived that the switching means are actuated in advance of the valve means.

29. The combination defined in claim 27 in which the electrically actuated valves are relatively remote from the local relay valves.

30. In a fluid pressure brake, the combination of a source of pressure fluid; a reservoir line fed thereby; a control line; brake cylinders; local relay valves subject to control line pressure, and serving to admit pressure fluid from the reservoir line to respective brake cylinders and to exhaust it therefrom; a control reservoir; a brake valve for admitting and exhausting pressure fluid to and from the control reservoir; valve means serving to control the admission of pressure fluid to and exhaust from said control line; an admission circuit including at least one electrically operable admission valve controlling admission of pressure fluid to the control line; an exhaust circuit including at least one electrically operable exhaust valve controlling exhaust from said control line; switching means controlling said circuits; means responsive to differentials between the pressures in said control reservoir and in said control line for actuating said valve means and said switching means; and valve means responsive to the rate of deceleration produced by a brake application, interposed between said brake valve and said control reservoir and serving to modulate pressure in the latter.

31. In a fluid pressure brake system, the combination of a source of pressure fluid; means for establishing a regulatory pressure; means responsive to the rate of deceleration produced by a brake application, and serving to modulate said regulatory pressure; a control line for controlling braking pressure; two motor means individually responsive to differentials between said regulatory pressure and pressure in said control line; valve means operated by one of said motor means and controlling admission of pressure fluid from said source to said control line and exhaust of fluid from said control line; an exhaust circuit including at least one electrically operable exhaust valve controlling exhaust from said control line; and switching means operable by the second of said motor means and arranged to control said circuit.

32. The combination defined in claim 31 in which the second motor means is a relatively sensitive flexible diaphragm and a plurality of electrically actuated exhaust valves of limited flow capacity are used and are located at intervals in the length of the control line.

33. The combination of a control line; means for establishing a regulatory pressure; and two relays each responsive to differentials between said regulatory pressure and pressure in said control line and arranged to vary the pressure in the control line, one of said relays including stabilizing means effective in the neutral position of the relay to resist motion from neutral position and the other relay being so arranged that its response diminishes the differential tending to move the first relay from said neutral position.

34. The combination of a control line; means for establishing a regulatory pressure; two relays each responsive to differentials between said regulatory pressure and pressure in said control line and arranged to vary the pressure in the control line, one of said relays including stabilizing means effective in the neutral position of the relay to resist motion from neutral position and the other relay being so arranged that its response diminishes the differential tending to move the first relay from said neutral position; and means for retarding the effect on the first relay of changes in said regulatory pressure.

35. The combination of a control line; means for establishing a regulatory pressure; and two adjacent relays each responsive to differentials between said regulatory pressure and pressure in said control line, one of said relays being arranged to admit and exhaust pressure fluid to and from the control line adjacent said relays and having stabilizing means effective in the neutral position of the relay to resist motion from said neutral position, and the other of said relays being relatively more sensitive and serving to admit and exhaust pressure fluid to and from said control line and so arranged that its response diminishes the differential tending to move the first relay from said neutral position.

36. The combination of a control line; means for establishing a regulatory pressure; two adjacent relays each responsive to differentials between said regulatory pressure and pressure in said control line, one of said relays being arranged to admit and exhaust pressure fluid to and from the control line adjacent said relays and having stabilizing means effective in the neutral position of the relay to resist motion from said neutral position, and the other of said relays being relatively more sensitive and serving to admit and exhaust pressure fluid to and from said control line and so arranged that its response diminishes the differential tending to move the first relay from said neutral position; and means for retarding the effect on the first relay of changes in said regulatory pressure.

37. In fluid pressure brake system electropneumatic means for effecting a brake application; pneumatic means for effecting a brake application; means effective in a neutral position of said pneumatic means for resisting the response of said pneumatic means; and means effective upon failure of the electro-pneumatic means to overcome said response-resisting means.

38. In a fluid pressure brake system electropneumatic means for controlling braking pressure; pneumatic means for controlling braking pressure; means effective in a neutral position of said pneumatic means for resisting its response for a time interval sufficient for the normal response of said electro-pneumatic means; and means, effective upon failure of the electro-pneumatic means to respond within said time interval, to overcome said response-resisting means.

39. In a vehicle brake system, the combination with a brake cylinder and a supply reservoir, of a valve device for controlling the supply of fluid under pressure from said reservoir to said brake cylinder; a control pipe; a manually operable brake controlling valve device for controlling the supply of fluid under pressure to said control pipe; electro-responsive valve means for controlling operation of said first-mentioned valve device; means including a switch device responsive to pressures in said control pipe for causing operation of said electro-responsive valve means to effect operation of said first-mentioned valve device to cause fluid under pressure to be supplied to said brake cylinder; and means for causing said switch means to effect lap of the supply to said brake cylinder when the pressure in said brake cylinder rises to within a predetermined value of the pressure in said control pipe.

40. In a vehicle brake system, the combination with a brake cylinder and a supply reservoir, of a valve device for controlling the supply of fluid under pressure from said reservoir to said brake cylinder and the release of such fluid from the brake cylinder; a control pipe; a manually operable brake controlling valve device for controlling the supply of fluid under pressure to and its exhaust from said control pipe; electro-responsive valve means for controlling operation of said first mentioned valve device; switching means responsive to pressures in said control pipe for causing operation of said electro-responsive valve means to effect operation of said first-mentioned valve device to cause fluid under pressure to be supplied to and released from said brake cylinder; and means for causing said switch means to effect lap of the supply to and release from said brake cylinder, when the pressure in said cylinder approaches the pressure in said control pipe within predetermined limits.

41. In a vehicle brake system, the combination with a brake cylinder and a supply reservoir, of a valve device for controlling the supply of fluid under pressure from said reservoir to said brake cylinder, a control pipe, a brake controlling valve device having a manually operable control element movable through a control zone, said brake valve device being operable to supply fluid under pressure to said control pipe to a degree corresponding to the degree or extent of movement of said control element, electroresponsive valve means for controlling operation of said first mentioned valve device, means including a switch device responsive to pressures in said control pipe for causing operation of said electroresponsive valve means to effect operation of said first mentioned valve device to cause fluid under pressure to be supplied to said brake cylinder, and means for causing said switch means to effect a lap of the supply to said brake cylinder when the pressure in said brake cylinder rises to within a predetermined value of the pressure in said control pipe.

42. In an electropneumatic brake, in combination, electrically controlled means operative to supply fluid under pressure to effect an application of the brakes, a switch operated by fluid under pressure for controlling said electrically controlled means, and a self-lapping brake valve for controlling the fluid pressure in said switch device.

43. In a fluid pressure brake system, the combination of a normally charged pipe; a normally vented control pipe; electrically actuated valve means for delivering air derived from the normally charged pipe to the control pipe; at least one local reservoir fed from the normally charged pipe and adapted to furnish air for brake applications; brake applying means adapted to respond to pressure in the control pipe; and valve means for protecting the charge in said local reservoir against depletion by flow through said electrically actuated valve means.

44. In a vehicle brake system, in combination, a brake cylinder, a brake control device having a release position and an application position, electroresponsive means operable upon movement of said brake control device to application position to effect a supply of fluid under pressure to said brake cylinder, pneumatic means operable to an application position upon the same movement of said brake control device to effect a supply of fluid under pressure to said brake cylinder, and means for preventing said pneumatic means moving to said application position so long as said electroresponsive means is effective in effecting a supply of fluid under pressure to said brake cylinder but automatically causing said pneumatic means to move to said application position should said electroresponsive means be ineffective.

45. In a vehicle brake system, in combination, a brake cylinder, electroresponsive valve means for effecting a supply of fluid under pressure to the brake cylinder by straight air operation, a circuit for supplying current to operate said electroresponsive valve means, means for connecting said circuit to a source of current supply to effect a straight air application of the brakes, and means automatically operated upon a failure of current in said circuit when connected to said source for effecting a supply of fluid under pressure to the brake cylinder by pneumatic operation.

46. In a vehicle brake system, in combination, a brake cylinder, an application magnet valve device and a release magnet valve device for controlling the supply of fluid under pressure to and its release from said brake cylinder, manually controlled means for effecting the operation of at least one of said two magnet valve devices, to effect a supply of fluid under pressure to said brake cylinder, and means operated according to the rate of retardation of the vehicle for subsequently and at a chosen rate of retardation effecting the operation of at least one of the same said two magnet valve devices to effect a release of fluid under pressure from said brake cylinder.

47. In a railway brake system, the combination with a plurality of brake cylinders for the different units in the train, of a valve mechanism for controlling the supply of fluid under pressure to and its release from said brake cylinders, a pipe extending throughout the train for supplying fluid under pressure to operate said valve mechanism to application position, means controllable from one end of the train for supplying fluid under pressure to said pipe at a plurality of points in the train, and means including a retardation controller device for reducing the pressure of fluid supplied to operate said valve mechanism to release fluid pressure from said brake cylinders.

48. In a railway train brake system, the combination with brake cylinders for one or more units in the train, of valve means for controlling the supply of fluid under pressure to and its release from said brake cylinders, means for effecting operation of said valve means either electropneumatically or pneumatically, a brake valve device for manually controlling said last means, and a retardation controller device operable at certain rates of retardation to effect electropneumatic operation of said valve means to cut off and diminish the supply of fluid to said brake cylinders.

49. In a vehicle brake system, the combination with a brake cylinder and a supply reservoir, of valve means operated according to the degree of fluid under pressure supplied thereto for controlling the supply of fluid under pressure from said reservoir to said brake cylinder, means including a switch device operated according to unbalanced fluid pressures for effecting a supply of fluid under pressure to said valve means to cause operation thereof to supply fluid under pressure to said brake cylinder, a brake controlling valve device having a manually movable control element and operable to effect a supply of fluid under pressure to said switch device to effect an unbalance of said switch device, and means for causing a pressure to be exerted in said switch device corresponding to the pressure established in said brake cylinder for opposing the unbalance of said switch device.

50. In a vehicle brake system, the combination with a brake cylinder and a supply reservoir, of valve means operated according to the degree of fluid under pressure supplied thereto for controlling the supply of fluid under pressure from said reservoir to said brake cylinder and for controlling the release of fluid pressure from said brake cylinder, a control pipe, a brake valve device having a manually movable control element and operable to supply fluid under pressure to said control pipe, switch means responsive to pressure in said control pipe, and electroresponsive valve means controlled by said switch means and operable to supply fluid under pressure to said first valve means.

51. In an electropneumatic brake, in combination, a magnet valve device operated upon energization thereof for supplying fluid under pressure to effect an application of the brakes, electric contact means for controlling the energization of said magnet valve device, a control chamber, a movable abutment subject to the opposing pressure of fluid in said chamber and the pressure of fluid supplied by said magnet valve device for operating said contact means, and a brake valve device for supplying fluid under pressure to said chamber.

52. In an electropneumatic brake, in combination, electrically controlled means operative to supply fluid under pressure to effect an application of the brakes, a switch device having a control chamber and operated by fluid pressure in said control chamber for controlling the energization of said electrically controlled means, and a brake valve device for supplying fluid under pressure to said chamber.

53. In a vehicle brake system, the combination with a brake cylinder, a control pipe, a straight air pipe and a supply reservoir, of means for supplying fluid under pressure to said control pipe in accordance with a desired degree of braking, electropneumatic means responsive to the pressure in said control pipe for effecting a supply of fluid under pressure to said straight air pipe, means responsive to the pressure in said straight air pipe for effecting a supply of fluid under pressure from said supply reservoir to said brake cylinder, and a valve device for preventing total loss of supply reservoir pressure due to faulty operation of said electropneumatic means.

54. In a fluid pressure brake system, the combination with a brake cylinder, of a valve device operable to control the supply of fluid under pressure to and its release from said brake cylinder, an electroresponsive valve device for controlling operation of said first valve device, a switch device having two chambers and a diaphragm subject on one side to the pressure in one chamber and on the other side to pressure in the other chamber, said switch device having contacts operated upon movement of said diaphragm, circuits connecting said contacts to said electroresponsive valve device, means for supplying fluid under pressure to one of said chambers to cause operation of said contacts to effect a supply of fluid under pressure to said brake cylinder, and means rendered effective upon operation of said electroresponsive device for supplying fluid under pressure to the other of said chambers to a degree corresponding to the degree of pressure established in said brake cylinder.

55. In an electropneumatic brake apparatus, in combination, a brake cylinder, an application magnet valve device operable to effect a supply of fluid under pressure to said brake cylinder, a release magnet valve device operative to effect a release of fluid under pressure from said brake cylinder, switch means controlled by fluid at brake cylinder pressure and an opposing fluid pressure for controlling the operation of said magnet valve devices, said switch means being operative upon a preponderance of said opposing fluid pressure to effect the operation of said application magnet valve device, and operative upon a preponderance of fluid at brake cylinder pressure to effect the operation of said release magnet valve device, and manually operable means for varying the degree of said opposing fluid pressure.

56. In an electropneumatic brake apparatus, in combination, a brake cylinder, electroresponsive means, an application contact operated to effect the operation of said electroresponsive means to effect a supply of fluid under pressure to said brake cylinder, a release contact operative to effect the operation of said electroresponsive means to effect a release of fluid under pressure from said brake cylinder, a brake valve device comprising a handle and valve means conditioned by said handle to supply fluid at a pressure corresponding to the manipulation of said handle, and means controlled by the opposing pressures supplied by said brake valve device and fluid at brake cylinder pressure for controlling said contacts and operable when the pressure supplied by the brake valve device exceeds that at brake cylinder pressure to operate said application contact to effect a supply of fluid under pressure to the brake cylinder, and operative when the fluid at brake cylinder pressure exceeds that supplied by the brake valve device to operate said release contact to effect the release of fluid under pressure from said brake cylinder.

57. In a fluid pressure brake, in combination, a brake cylinder, an electrically operated self-lapping valve means for controlling the supply of fluid under pressure to said brake cylinder, manually operable means for controlling the operation of said valve means and having a service application zone, movement to a position in which zone supplies fluid under pressure to effect an application of the brakes, and means including an inertia type retardation controller effective when the manually operable means is positioned in the service application zone for automatically controlling the application of the brakes to effect a selected rate of retardation of the vehicle.

58. In a vehicle brake system, in combination, a brake cylinder, electrically operated valve means operable when energized to effect a supply of fluid under pressure to said brake cylinder, a circuit for supplying current to energize said electrically operated valve means, valve means having a movable abutment normally maintained in a biased position and being operative upon movement from said biased position to effect a supply of fluid under pressure to said brake cylinder, and means operable so long as the circuit to said electrically operated valve means is intact for maintaining said movable abutment in said biased position and being automatically operable when an application of the brakes is effected and said circuit is broken to cause said movable abutment to be shifted to a position for effecting a supply of fluid under pressure to said brake cylinder.

59. In a fluid pressure brake system, in combination, a pipe, a brake control handle, means for varying the pressure in said pipe responsive to manipulation of said handle, electropneumatic means conditioned to effect an application of the brakes to a degree according to the variation of pressure in said pipe, fluid pressure means also conditioned to effect an application of the brakes according to the variation of pressure in said pipe, and means for inhibiting the operation of said fluid pressure means so long as said electropneumatic means is effective to produce the application, and automatically permitting operation of said fluid pressure means to produce the application upon failure of said electropneumatic means.

60. In a fluid pressure brake system, in combination, a pipe, means for varying the pressure in said pipe according to a desired degree of application of the brakes, switch means, means for conditioning said switch means according to the variation of pressure in said pipe, electroresponsive means controlled by said switch means for effecting an application of the brakes, and fluid pressure means for operating said switch means to lap the application of the brakes when the degree of application corresponds to the variation of pressure in said pipe.

CHARLES A. CAMPBELL.